United States Patent [19]

Ponzielli

[11] Patent Number: 4,760,717
[45] Date of Patent: Aug. 2, 1988

[54] WASHING MACHINE FOR WASHING OFF OR SEPARATING PLASTIC FILM FROM PAPER OR CELLULOSE FIBERS OR OTHER POLLUTANTS AND METHOD RELATING THERETO

[75] Inventor: Giuseppe Ponzielli, Milan, Italy

[73] Assignee: Fibropolimeri S.R.L., Italy

[21] Appl. No.: 688,169

[22] Filed: Jan. 2, 1985

[30] Foreign Application Priority Data

Jan. 10, 1984 [IT] Italy .............................. 19094 A/84

[51] Int. Cl.⁴ .............................................. D21D 5/28
[52] U.S. Cl. ................................... 68/181 R; 68/175;
162/243; 210/173; 210/174
[58] Field of Search ...................... 8/156, 159; 68/133,
68/175, 147, 181 R; 209/273, 268, 306; 241/24,
79.1, 86.1, DIG. 38, 68, 69, 73, 75, 98; 210/173,
174; 162/55, 57, 60, 243

[56] References Cited

U.S. PATENT DOCUMENTS

| 227,064 | 4/1880 | Sewell ..................... 209/306 |
| 741,530 | 10/1903 | McFarland ................... 162/243 |
| 2,347,716 | 5/1944 | Staege ..................... 209/306 X |
| 2,508,495 | 5/1950 | Consalvo ..................... 366/85 |
| 2,954,173 | 9/1960 | Dunwody ................... 241/86.1 X |
| 3,189,516 | 6/1965 | Duchange ................... 162/243 X |
| 3,411,721 | 11/1968 | Delcellier .................... 241/73 X |
| 4,031,013 | 6/1977 | Skretting .................... 209/306 X |
| 4,193,865 | 3/1980 | Aario ........................ 209/273 X |
| 4,199,263 | 4/1980 | Menges et al. ............... 366/307 X |
| 4,234,417 | 11/1980 | Gauld et al. ................. 209/273 X |
| 4,256,407 | 3/1981 | Seiderman ................... 241/73 X |
| 4,351,728 | 9/1982 | Egelhof et al. ................ 162/55 X |
| 4,383,918 | 5/1983 | Chudka et al. ................ 209/273 X |
| 4,440,635 | 4/1984 | Reiniger .................... 209/306 X |

FOREIGN PATENT DOCUMENTS

874815 10/1981 U.S.S.R. .......................... 162/243

Primary Examiner—Philip R. Coe
Assistant Examiner—Frankie L. Stinson
Attorney, Agent, or Firm—Darby & Darby

[57] ABSTRACT

Washing machine for washing off or separating plastic film, for example polythene, from paper or cellulose fibers or other pollutants comprising a container 1 into which the material to be washed consisting of plastic film with residual quantities of paper or cellulose or other pollutants is introduced at the same time with the water or subsequently thereto and then stirred by washing mechanical means, wherein said container 1 has a concentric surface 3 inside it which is provided with holes and forms an annular chamber 4 and wherein one or two vertical rotary shafts 5 and 6 are provided rotating in opposite directions with respect to each other and respectively bearing two series of radial agitators 7 and 8 penetrating into each other in the center of the container so that the water containing paper or cellulose fibers or other pollutants passes through the holes being thus discharged separately from the plastic film and wherein each of said series of agitators 7 and 8 carries one or more agitators provided at their ends with a blade 18 that, during the rotation, contacts a counter-blade 19 integral to the container 1.

5 Claims, 2 Drawing Sheets

— 1 —

WASHING MACHINE FOR WASHING OFF OR SEPARATING PLASTIC FILM FROM PAPER OR CELLULOSE FIBERS OR OTHER POLLUTANTS AND METHOD RELATING THERETO

FIELD AND BACKGROUND OF THE INVENTION

There is presently in the world a high production of thin cardboard matched on both faces with a plastic film such as polythene, sometimes also coupled to an aluminum film, so as to form a sandwich. Said sandwich sheet is widely used for producing many kinds of disposable containers among which the most important ones are those destined to contain new or long preservation milk.

The firms producing this type of thin sandwich cardboard usually have a high quantity of scraps due both to the big productions involved and to the strict quality standards to which said production is subjected. As a consequence of that, many paper mills have been arising in the world which became specialized in processing these amounts of scraps in order to obtain therefrom, after a suitable pulping process, a cellulose of normally high quality. Actually, paper mills that process the scrap-sandwich sheets mentioned above produce scraps too, that is the plastic film, combined or not with aluminum film, that remains after the cellulose fiber has been reclaimed.

The problem concerning the reuse of said scrap plastic film is very important as the amount of said scraps, which in a middle-sized paper mill is about 2000 tons per year, can only be destroyed in a very expensive manner while on the other hand, it could be a precious raw material especially to be used for injection molding.

First of all it is necessary to remember that the present technology for washing the different types of scrab plastic films available on the market is not suitable to be applied to the material in question; in fact the washing machines of the known art are based on the conviction that a very fast movement of the only washing blade (1400/1800 rotations per minute) is necessary to allow the water to be directed towards all the particles of the milled film. Actually, not only in the above mentioned washing machines a lot of energy is employed, which makes the economical character of the machine quite questionable, but also the cleaning result of each single plastic fragment cleared off from the paper and cellulose fibers adhering thereon before the process, is very disappointing. In fact, no more than 200 kg per hour of material are washed using at least 180 HP and the water discharged from the washing machine still appears cloudy and polluted by the cellulose, which presumably means that the cycle of mechanical separation of the fibers has not yet been completed.

After a washing process carried out using a washing machine of the known art and respecting an average production of about 200–250 kg per hour, it is possible to evaluate that the degree of residual pollution due to cellulose fibers in a plastic film containing about 20% of fiber when introduced in the machine, is not less than 3-5%.

What stated above is also valid when it is necessary to wash plastic material polluted for example by the presence of earth, as in the case of sheets used in agriculture, or of other pollutants.

OBJECT AND SUMMARY OF THE INVENTION

It is therefore an object of the present invention to obtain a quite perfect washing off or separation of plastic film from paper or cellulose fibers or from other pollutants, in which the residual pollution is less than 1%, while using a low amount of energy.

This object is attained by a washing machine the main features of which are emphasized in claim 1 while the details are emphasized in the dependent claims, in said claims being also described the method to be followed when using said washing machine.

BRIEF DESCRIPTION OF THE DRAWINGS

An embodiment of the present invention showing the advantages thereof is described hereinafter by way of example only with reference to the accompanying drawings, in which.

DESCRIPTION OF THE PREFERRED EMBODIMENT

Figure 3:
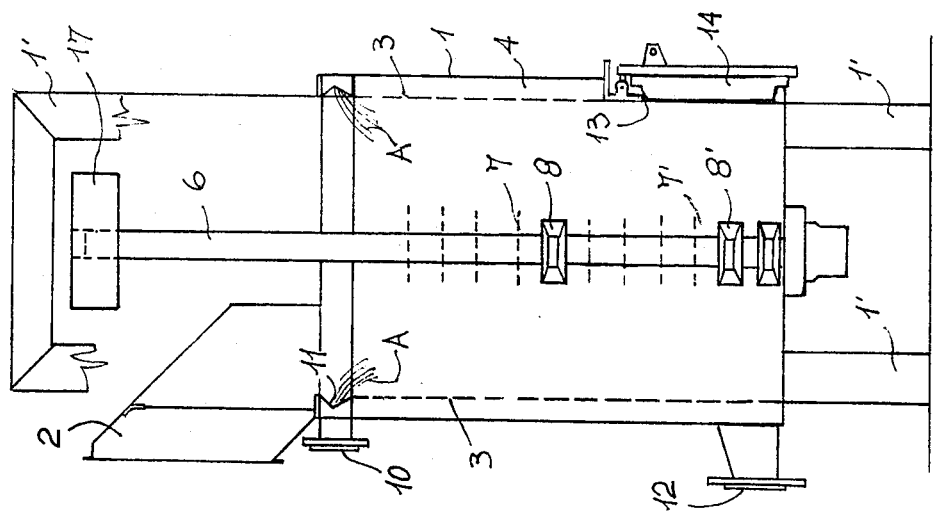
FIG. 3 is a vertical cross-sectional view taken along line III—III in FIG. 2.
Figure 1:
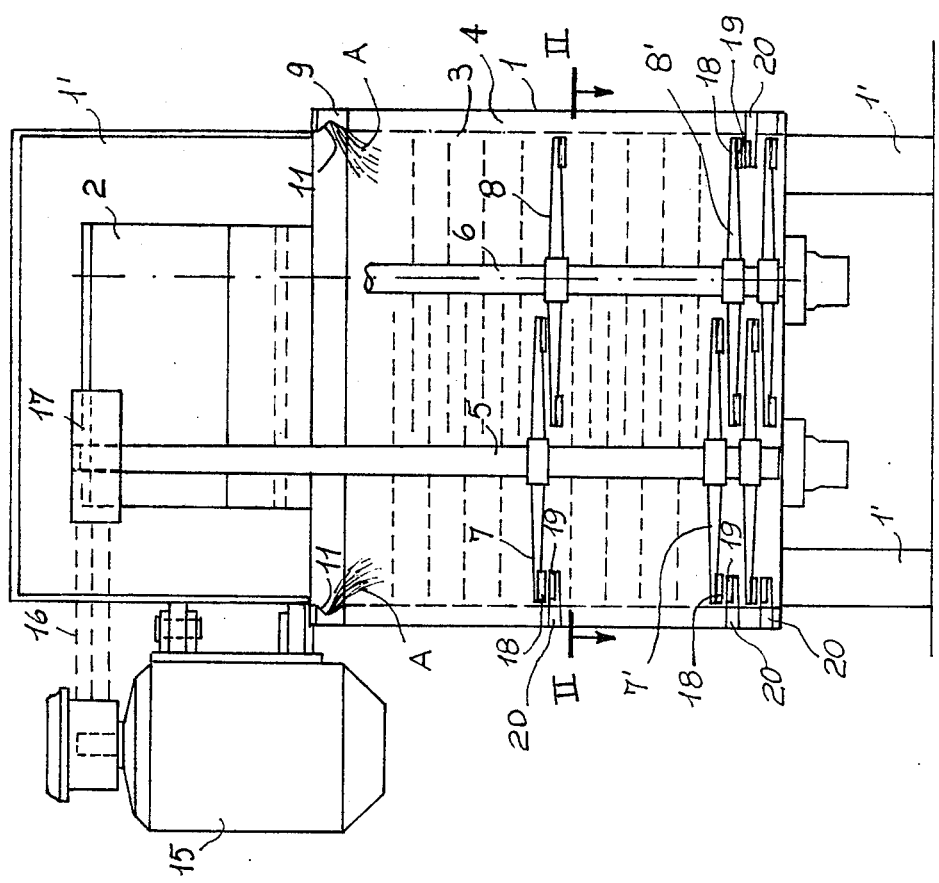
FIG. 1 is a vertical cross-sectional view of the washing machine of the invention.
Figure 4:
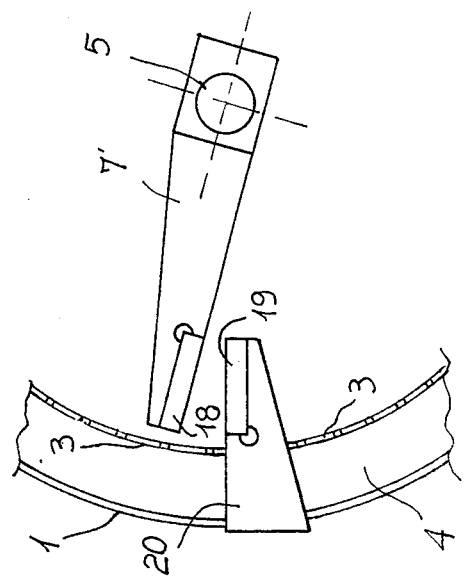
FIG. 4 shows a detail of a milling blade and its respective counter-blade.
Figure 2:
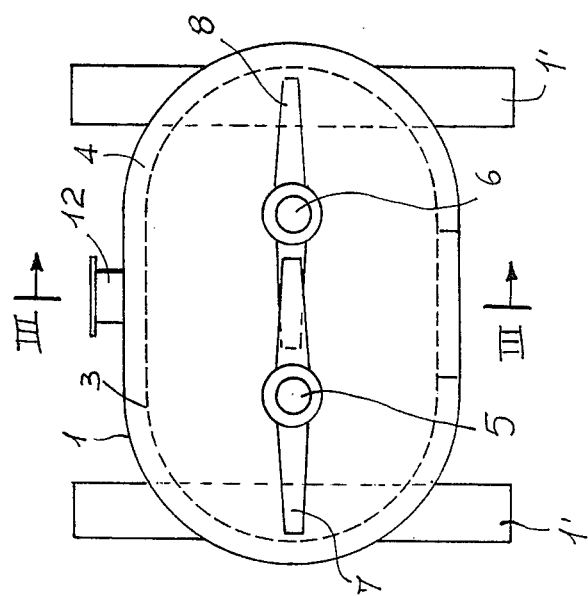
FIG. 2 is a horizontal cross-sectional view taken along line II—II in FIG. 1.

The washing machine of the invention comprises a container 1 into which the material in pieces consisting of plastic film, residual paper or cellulose or other pollutants and eventually of aluminum film, is introduced through a trap-like opening 2 at the same time with the washing water or subsequently thereto, said water being introduced through inlet means to be described later.

Said container 1 has a concentric surface 3 inside it provided with small holes the diameter of which is about 2 mm, thereby forming an annular chamber 4.

Within said container 1 two vertical shafts 5 and 6 rotate in opposite directions with respect to each other and respectively bear two series of radial agitators 7 and 8 penetrating into each other in the center of the container 1, which in turn is supported by the casing 1'.

Said container, seen in horizontal section, has an elliptical form so that said inner concentric surface 3 provided with holes is grazed by the two series of agitators 7 and 8 during their rotation in opposite directions about the axes of shafts 5 and 6.

At its upper part the container 1 has an annular duct 9 connected to the water inlet 10 and provided with nozzles 11 positioned in such a way that the water jets A coming out of the same are directed all around towards said shafts 5 and 6 and can therefore impinge the material enclosed in the container 1 while it is stirred by said agitators 7 and 8.

At the lower part of the container, in the annular chamber 4, a water outlet duct 12 is provided, on the same side where the water inlet 10 is. In fact, water passes through the holes provided on surface 3 carrying along the residual cellulose or other pollutants contained in the material introduced. The bottom of the annular chamber 4 is provided with a clearance 13 communicating with the inside of container 1 and closed by a gate 14 which is opened when, at the end of the cycle, the plastic material already washed, that is cleared off from the residual cellulose and other pollutants, has to be evacuated.

The evacuation takes place when all water contained in duct 12 has come out; at this point, a few rotations of the agitators 7 and 8 are sufficient to cause the plastic material to be discharged, by the centrifugal force, through the clearance 13, being then directed to the subsequent processing stations not described here as they are not part of the present invention.

During the operation, that is during the washing, the gate 14 is kept closed.

The two shafts 5 and 6 are rotated by two geared motors connected through a belt to pulleys fitted on shafts 5 and 6 respectively. In the figures only one geared motor 15 is shown which is connected to a pulley 17 through a belt 16. So the two geared motors are disposed on the opposed curved sides of the container 1. On the contrary, on the two opposed flat sides of the washing machine are respectively disposed the water inlet 10 and outlet 12 and the clearance 13 for discharging the plastic material as discussed above.

In order to allow the best milling of the material introduced into the washing machine and therefore the best washing of the same, each of said series of agitators 7 and 8 bears one or more agitators 7' and 8' carrying a milling blade 18 at their ends, which during the rotation contacts a counter-blade 19 integral to a rod 20 fastened in turn to the container 1.

One or more of said fixed counter-blades 19 of each series of agitators 7 and 8 can be retracted using means not shown in the figures, in order to stop the cutting action otherwise occuring with the corresponding movable blade 18. This cut stoppage might be necessary depending upon the material being processed and it is especially required at the end of the washing cycle.

Preferably said movable blades 18 are disposed on the lower part of shafts 5 and 6, for example on the last or the last but one agitators from the bottom.

In the container the material is put in motion together with the water by the agitators 7 and 8 rotating at a low speed and is therefore "hackled" and sent towards the center where it is always subjected to the desired mechanical action.

The number of revolutions of the two shafts is very reduced as it has been found that a high mechanical force is not necessary to obtain a good washing: in fact it is sufficient a mechanical precision action on the agitators of the milled plastic film to produce the washing effect in the presence of an important amount of water.

It should be noted that the number of revolutions (150-500 revolutions per minute) of the shafts of the present invention is about ten times lower than the number of revolutions of a shaft having only one blade of the type provided in the washing machines of the known art.

The cellulose fibers and other impurities pass through the holes of the surface 3 during the washing cycle and, through chamber 4 and outlet 12, they are conveyed to the outside, while the washed plastic material is evacuated through gate 14.

Furthermore, the low speed of the shafts allows to reduce the formation of small plastic fragments to a minimum, which is an advantage as the latter might pass through the holes of the perforated surface 3 and consequently pollute the cellulose contained in the water discharged from the washing machine.

By way of example, the tests carried out by adopting a washing cycle according to the following procedure have given an excellent result allowing to obtain a plastic film containing a residual pollution lower than 1%:

(a) charging the container 1 with water, for example 1500 liters, through the water inlet 10, the outlet duct being closed;

(b) charging the container 1, at the same time with the introduction of water or subsequently thereto, with the material to be washed, for example 150 kg containing about 50% of humidity, coming from the pulping process or other previous mechanical operations; it is important to observe that a high dilution of the water suspension is thus possible;

(c) starting the rotary motion of shafts 5 and 6 carrying the agitators 7 and 8 while water, about 1250 liter per minute, enters through the inlet 10 and is evacuated through the outlet 12 for a period of work of about 2'30";

(d) stopping the water flow and evacuating the residual water;

(e) discharging the cleaned wet plastic material.

The best results are obtained by diluting the water suspension so that the solid material ranges from 1 to 15%.

The washing water can then be reclaimed by a process not described being then recycled by the separation of the cellulose fibers or other pollutants from the small amount of plastic material that passed through the holes of the perforated surface 3.

It should be noted that the material to be washed consists of plastic film, and eventually aluminum film, with residual quantities of paper, cellulose, earth or other pollutants, the sizes of the last mentioned residual products, by virtue of the preceding pulping or milling processes, being such that they can pass through the holes of the perforated surface 3.

Obviously modifications and verifications can be made to the preferred embodiment of a washing machine as described above and to the method related thereto without departing from the spirit and scope of the invention itself.

A variation not shown in the figures could consist of a washing machine provided with only one vertical shaft, instead of the two shafts 5 and 6 as mentioned above, rotating within a container of circular section. Said shaft is provided with one series of radial agitators which, during the rotation, can graze the fixed agitators when the latter are provided to be fastened to the container.

What is claimed is:

1. A washing machine for separating plastic material pieces from contaminants, the latter being smaller in size than said pieces, by a batch process comprising a container having a substantially flat bottom for receiving said plastic materials pieces, contaminants and water, said container having a concentric internal wall bearing a plurality of apertures spaced apart from an external wall to form an annular chamber surrounding the interior of said container;

rotary shaft means comprising first and second rotary shafts mounted vertically within said container, said rotary shaft means including a plurality of agitators mounted radially about and disposed along said shafts from the flat bottom of said container for washing and separating said plastic material pieces from said contaminants, said shafts rotating in opposite directions with respect to each other and the agitators of said first shaft overlapping the agitators of said second shaft substantially at a center of said container;

drive means for rotating said rotary shaft means;

inlet means for introducing a water stream into said container;

normally opened fluid outlet means located in the lower section of said external wall substantially at the level of said flat bottom to permit removal of said water and contaminants; and normally closed gate means located substantially at the level of said flat bottom in the lower part of said container extending through said internal wall and adapted to be opened after said removal of water and contaminants for allowing the forcible centrifugal ejection of washed plastic material pieces from the interior of said container through said opened gate means by limited rotation of said agitators.

2. An apparatus for separating plastic material and contaminants, comprising a container for receiving said plastic material and contaminants and water defined by at least an inner wall, said inner wall having a plurality of apertures;

inlet means for introducing a water stream at the upper end of said container;

fluid outlet means at the lower end of said wall;

access means at the end of said container allowing access to the interior of said container;

rotary agitation means including a plurality of shaft-mounted agitators having a plurality of blades, a plurality of counter-blades mounted within the inner wall of the container for working engagement with the blades of the agitators, said counter-blades being movably mounted within the inner wall to vary an engaging area of the blades and counter-blades, first and second outlet means being provided within a lower part of the container;

said first outlet means being adapted for evacuation of the water from the container, said second outlet means being adapted for discharging the separated plastic material from the container, said second outlet means comprising a labyrinth slot defined within the wall of the container, whereby the separated plastic material is discharged from the container through the labyrinth slot by centrifugal forces of the rotated agitators.

3. An apparatus in accordance to claim 2 wherein said inner wall of the container defines a substantially cylindrical surface and said agitator means, blades and counter-blades extend throughout the entire diameter of said cylindrical surface.

4. An apparatus in accordance to claim 2 wherein the plastic containing the contaminants is introduced into the container through a trap-type opening positioned on the top of the container.

5. An apparatus in accordance with claim 2 wherein said agitators with the blades are located substantially at the bottom of the container and an opening of the labyrinth slot is positioned within the inner wall of the cylinder substantially above the agitators.

* * * * *